(12) United States Patent
Miller et al.

(10) Patent No.: US 8,883,300 B1
(45) Date of Patent: Nov. 11, 2014

(54) MODIFICATION OF WOOD-BASED LIGNOCELLULOSIC MATERIAL

(76) Inventors: John C. Miller, Fresno, CA (US); Deborah L. Miller, Fresno, CA (US)

( * ) Notice: Subject to any disclaimer, the term of this patent is extended or adjusted under 35 U.S.C. 154(b) by 238 days.

(21) Appl. No.: 13/373,502

(22) Filed: Nov. 15, 2011

Related U.S. Application Data

(60) Provisional application No. 61/416,000, filed on Nov. 22, 2010.

(51) Int. Cl.
*B32B 5/16* (2006.01)

(52) U.S. Cl.
USPC ........... 428/323; 428/402; 428/403; 428/404; 428/532; 428/536; 428/537.1; 427/343; 106/15.05

(58) Field of Classification Search
USPC .............. 428/402, 532, 536, 537.1, 403, 404, 428/323; 427/343; 106/15.05
See application file for complete search history.

(56) References Cited

U.S. PATENT DOCUMENTS

| | | | | |
|---|---|---|---|---|
| 4,329,882 A | * | 5/1982 | Kaup | 73/864.44 |
| 5,094,892 A | * | 3/1992 | Kayihan | 427/440 |
| 5,169,687 A | * | 12/1992 | Sunol | 427/297 |
| 5,549,739 A | * | 8/1996 | Inoue et al. | 106/15.05 |
| 5,910,555 A | * | 6/1999 | Ueda et al. | 528/34 |
| 6,608,129 B1 | * | 8/2003 | Koloski et al. | 524/403 |

FOREIGN PATENT DOCUMENTS

EP 0934819 * 8/1999

* cited by examiner

*Primary Examiner* — Leszek Kiliman
(74) *Attorney, Agent, or Firm* — Joan I. Norek; The Law Office of Joan I. Norek

(57) ABSTRACT

Porous wood-based lignocellulosic material is modified by incorporating into its pore matrix a bonded silica filling. An immobilized-silica precursor such as a water-glass solution of silica subunits or a colloidal silica is used to produce the filling, such as by immersion of the lignocellulosic material therein. The impermeable wood-based lignocellulosic material produced thereby is inflammable and impermeable to penetration by fluids and pests.

10 Claims, 2 Drawing Sheets

MODIFICATION OF WOOD-BASED LIGNOCELLULOSIC MATERIAL This application claims the domestic priority benefit of application No. 61/416,000 filed on Nov. 22, 2010, inventors Miller et al., for Modification of Wood-based Lignocellulosic Material.

BACKGROUND OF THE INVENTION

The present invention relates to porous wood-based lignocellulosic material, particularly manufactured wood-based products. The present invention more particularly relates to the modification of porous wood-based lignocellulosic material and the treatment method by which the modification is accomplished.

By porous wood-based lignocellulosic material is meant herein material of or derived from lignocellulosic biomass of wood. The primary constituents of lignocellulosic biomasses generally are cellulose and hemicellulose polysaccharides and lignin. Common wood-based lignocellulosic materials include, without limitation, lumber, plywood, hardboard, particle board and cardboard.

While there is a wide variation in properties of porous wood-based lignocellulosic materials, they are all, unless treated, flammable, hydrophilic and susceptible to pest damage. None of these porous wood-based lignocellulosic materials has any significant strength beyond the strength derived from density and/or thickness and/or lamination, such as the cross-grain lamination of plywood. All of these porous wood-based lignocellulosic materials shrink, deform, dry out, deteriorate and otherwise fail over time. In other words, all have limited lifetimes.

There are many applications, including without limitation various uses in the construction field, in which such limited-lifetime properties of porous wood-based lignocellulosic material are undesirable, and at times prohibit the use of a given lignocellulosic material.

SUMMARY OF THE INVENTION

The present invention is a method for modifying porous wood-based lignocellulosic material by incorporating into its pore matrix a bonded silica filling. The method is accomplished using a fluid immobilized-silica precursor (precursor to the bonded silica filling) such as a water-glass solution of silica subunits and a colloidal silica within a specific particle-size range. The immobilized-silica precursor is charged to the pore matrix of the wood-based lignocellulosic material by immersion, and is then cured, providing a substantially impermeable wood-based lignocellulosic material having unique, advantageous properties. The present invention is also the impermeable wood-based lignocellulosic material produced by the method.

DETAILED DESCRIPTION OF THE INVENTION

Colloidal Silica

Figure 1:
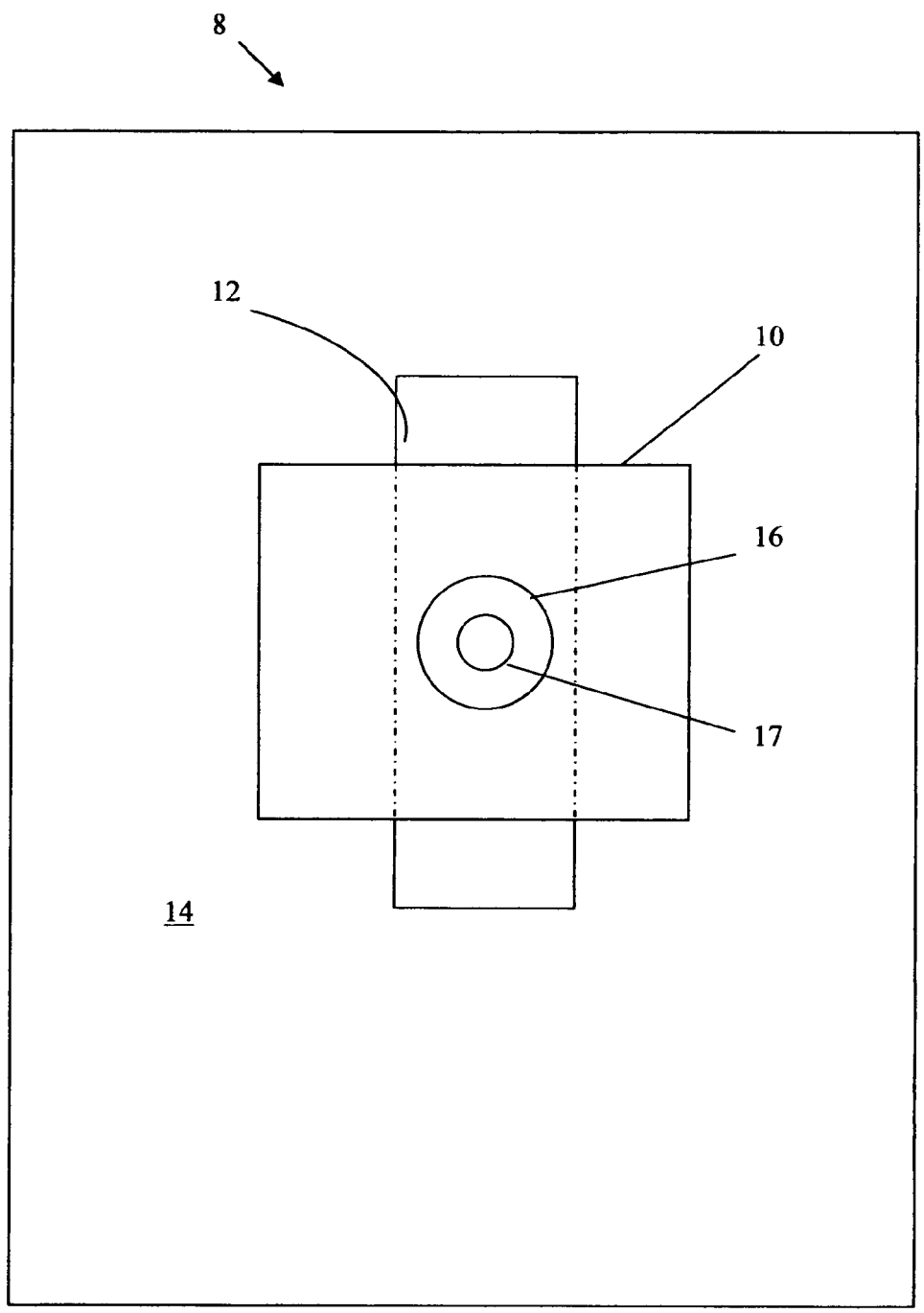
FIG. 1 is a not-to-scale partially-diagrammatical plan view of an impermeable lignocellulosic material of the present invention together with apparatus components of a strength-testing method.

Colloidal silica, which is sometimes also referred to as silica sol, is a monodispersed sol of silicon dioxide. It is a stable dispersion of discrete, amorphous, roughly-spherical silica particles. The silica particles of colloidal silica are produced by polymerizing silicic acid, which is a tetrahedral molecule of silicon and O—H functionalities. Silicic acid can be considered to be $H_4SiO_4$ and, as its "acid" name implies, it is a weak acid with some hydrogens that can be ionized off the molecule. Silicic acid is generally formed from an alkali silicate, which usually is a sodium silicate rather than a potassium silicate, and varies in its ratio of silica/sodium oxides ($SiO_2$:$Na_2O$). Silicic acid is formed by the acidification of sodium silicate while separating the sodium ion from the silicic acid molecules, whereby typically silicic acid and small oligomers of silicic acid are formed. Silicic acid, which is an unstable molecule, can also be considered deionized sodium silicate.

Silicic acid polymerizes by the condensation of two O—H functionalities, with the elimination of $H_2O$, to form a covalent Si—O—Si bond between two silicic acid molecules. This link or bridge can be formed at any corner of the tetrahedral molecules, and since there is free rotation of the linked tetrahedra with respect to each other, the polymer(s), and the silica particle being formed, can grow in three dimensions, resulting in the formation of roughly spherical particles. The polymerizations can generally be halted at the point required to produce a monodispersed colloid of a predetermined particle size. By monodispersed is meant that the particles of a given colloidal silica have a uniform particle size. The selection or predetermination of that particle size can be accomplished by pH adjustment. Alternatively, the polymerizations can also produce a colloid of a broader, but still predetermined, particle-size distribution by adjusting the feed rate of silicic acid over a period of time. The use of such broad-dispersion colloids is not excluded from the present invention and in some embodiments their use may be advantageous. Colloidal silica retains active, or potentially active, —Si—O—H sites at the surfaces of the silica particles.

The Method

Wood-based lignocellulosic material, including conventional wood-based lignocellulosic products such as lumber, plywood, hardboard, particle board and cardboard, are porous. The pores of these materials form a pore matrix wherein the discrete pores are open to neighboring pores, and the pore matrix is three-dimensional. The substance within a pore matrix is normally the fluid of the surrounding environment. Under dry conditions, that fluid would normally be air. Under wet conditions, the fluid would be water, or a combination of water and air depending on the degree of penetration of water. The volumetric proportion of the pore matrix to the body of the wood-based lignocellulosic material varies depending on the specific wood type and post-harvest treatment and handling. For example, the pore matrix of cardboard claims a high volumetric proportion while the pore matrix of hardwood lumber has a low volumetric proportion. Despite the volumetric-proportion variations, and variations in pore size, all normal wood-based lignocellulosic material have a pore matrix, and that matrix is inhabited by one or more fluids, which typically is air. The method of the present invention displaces the fluid(s) with silica and immobilizes the silica to preclude subsequent displacement of the silica.

The first step of the present method is to charge an immobilized-silica precursor to the pore matrix. The immobilized-silica precursor may be a colloidal silica within a specific particle-size range or distribution of particle-size ranges, or a precursor to such a colloidal silica such as a water-glass solution of silica subunits. The immobilized-silica precursor itself of course must be fluid in order to accomplish the displacement, or partial displacement, of the fluid already occupying the pore matrix. The step of charging an immobilized-silica precursor to the pore matrix can be accomplished simply by immersion (including sufficient soaking of the surfaces) of the porous wood-based lignocellulosic material with or in the immobilized-silica precursor under ambient air pressure. A water-born immobilized-silica precursor for instance would be readily taken up by the typical cardboard product. The penetration of lumber with such an immobilized-silica precursor may proceed too slowly for practical purposes, and in such instances the charging of the immobilized-silica precursor may be conducted under elevated pressure.

The charging should proceed for the length of time and/or under the degree of pressure, required to displace the fluid inhabiting the pore matrix to at least the degree sufficient to impart the target properties upon the completion of the method.

When the immobilized-silica precursor is a colloidal silica, the silica particles should be within the size range of from about 10 to about 80 Angstrom units. As mentioned elsewhere, colloidal silicas are generally monodispersed colloids. The immobilized-silica precursor may be a single monodispersed colloidal silica within the particle size range, or a combination or mixture of monodispersed colloidal silicas provided each colloidal silica is itself within the particle size range. When the immobilized-silica precursor is a precursor to such a colloidal silica, such as a water-glass solution of silica subunits, the curing is conducted under a pH sufficient to produce silica particles within the particle size range.

The curing of the immobilized-silica precursor within the porous wood-based lignocellulosic material may be a simple drying under ambient temperatures. In other words, the porous wood-based lignocellulosic material may simply be air dried, that is, be left to dry out. The porous wood-based lignocellulosic material preferably is dried to the point of constant weight, that is, the point at which further weight loss is not detected at suitable time intervals despite additional drying. The drying of the porous wood-based lignocellulosic material may proceed too slowly for practical purposes, and in such instances the drying of the porous wood-based lignocellulosic material may be conducted under elevated temperature. In addition, the curing temperature, regardless of whether it is ambient or elevated, may be (further) elevated at some point in time after the curing period has commenced to enhance the reactions that proceed during the curing step.

When the colloidal silica is formed in situ, namely when the immobilized-silica precursor is a precursor to such a colloidal silica, such as a water-glass solution of silica subunits, there is an increased penetration of the pore matrix which results in higher degree of impermeability of the end product. The process steps, however, are more complicated and therefore such embodiment is preferred only for certain porous wood-based lignocellulosic material and/or certain end uses.

The Chemistry

In the curing stage, the silica's active sites (—Si—O—H) react with the porous wood-based lignocellulosic material's —C—O—H sites. Increasing the temperature beyond the curing stage (constant weight) just pushes the reaction further, forming more —Si—O—C— linkages, and thereby forming a higher degree of covalent bonding between the porous wood-based lignocellulosic material and the silica. The same is true with adjacent silica particles within the pore matrix. The active sites, namely the —Si—O—H linkages, react to form —Si—O—Si— linkages. When this reaction takes place, the overall effect is to form a strong, covalently-bonded group of larger silica particles that are intricately intra-woven throughout the pore matrix and also bound to the wood surfaces. This results in providing to the porous wood-based lignocellulosic material the characteristics of "petrified wood".

The reaction of colloidal silica active site with the wood surface bounding a pore of the pore matrix is shown below, wherein in all of the chemical equations below "WP" means "wood particle, and "SP" means "silica particle":

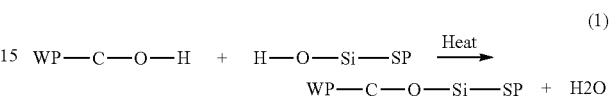

(1)

The reaction of the colloidal silica active sites within the wood pore is shown below:

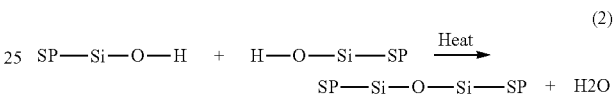

(2)

Since both reactions 1 and 2 are taking place inside the pore matrix of a porous wood-based lignocellulosic material, the overall reaction chemistry in its most basic form is a combination of reactions of reactions 1 and 2 and is demonstrated in reactions 3 and 4.

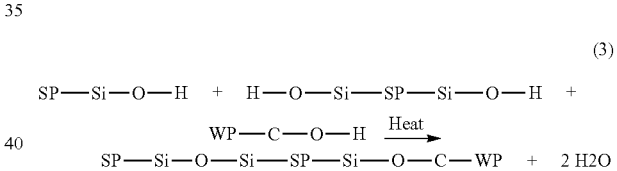

(3)

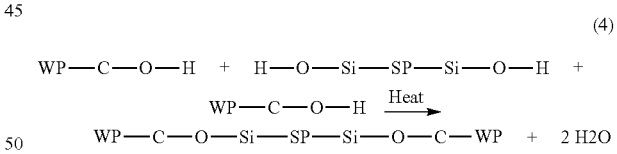

(4)

Upon addition of the colloidal silica to the complex structure (as to size, shape and connectivity) of the pore matrix, the colloidal silica fills in this extensive three-dimensional pore matrix. Elevating the temperature of these two materials (silica and wood) results in a condensation reaction between adjacent silica particles as well as adjacent O—H species, available on the wood surface. The reaction product forms a vast and intricate three dimensional polymer network in which the colloidal silica becomes covalently bonded to itself and covalently bonded to the wood surface. The resultant product no longer resembles wood or colloidal silica. The end product is a vast polymeric silica network that is intricately distributed and bonded to the wood surface and throughout the pore matrix of the porous wood-based lignocellulosic material.

Properties of the Modified Porous Wood-Based Lignocellulosic Material

The unmodified porous wood-based lignocellulosic material is flammable. The modified porous wood-based lignocellulosic material is non-flammable and can easily withstand a propane torch for extended periods of time with minimal damage. In comparison, unmodified porous wood-based lignocellulosic material is totally consumed by fire in minutes under such conditions.

The unmodified porous wood-based lignocellulosic material is hydrophilic and easily absorbs and retains water. The modified porous wood-based lignocellulosic material is hydrophobic and repels water. The modified porous wood-based lignocellulosic material is impermeable and water is not absorbed even after immersion for extended time periods.

The unmodified porous wood-based lignocellulosic material is readily attacked by pests and can be severely damaged by pest infestations. The modified porous wood-based lignocellulosic material is unaffected by pests and damage due to pests for three reasons. First, since it is more like rock than wood, the mechanisms the pests use on wood (i.e. chewing, gnawing, metabolizing and the like) do not work. Second, it retains no moisture and is hydrophobic, and such substantially anhydrous conditions are adverse to pest propagation. Third, silica cannot be metabolized by pests and therefore there is no reason for the pest to use it as a food source.

The modified porous wood-based lignocellulosic material is vastly stronger than the unmodified porous wood-based lignocellulosic material. The latter might be akin to a wooden wall while the former would be akin to a concrete wall of the same size.

Unmodified porous wood-based lignocellulosic material shrinks, deforms, dries out and changes over time whereas the modified porous wood-based lignocellulosic material retains its shape indefinitely.

Unmodified porous wood-based lignocellulosic material has a finite lifetime, whereas the modified porous wood-based lignocellulosic material might last indefinitely.

Both of the "raw materials", namely silica sand (from which colloid silica is produced) and the porous wood-based lignocellulosic material, are environmentally friendly, very economical and easy to manufacture. Both are almost in infinite supply and recycled porous wood-based lignocellulosic material products can also be used. When a modified porous wood-based lignocellulosic material is disposed of, no toxic or hazardous waste is formed.

EXAMPLES 1-4

Strength-Test Procedure and Apparatus

Figure 2:
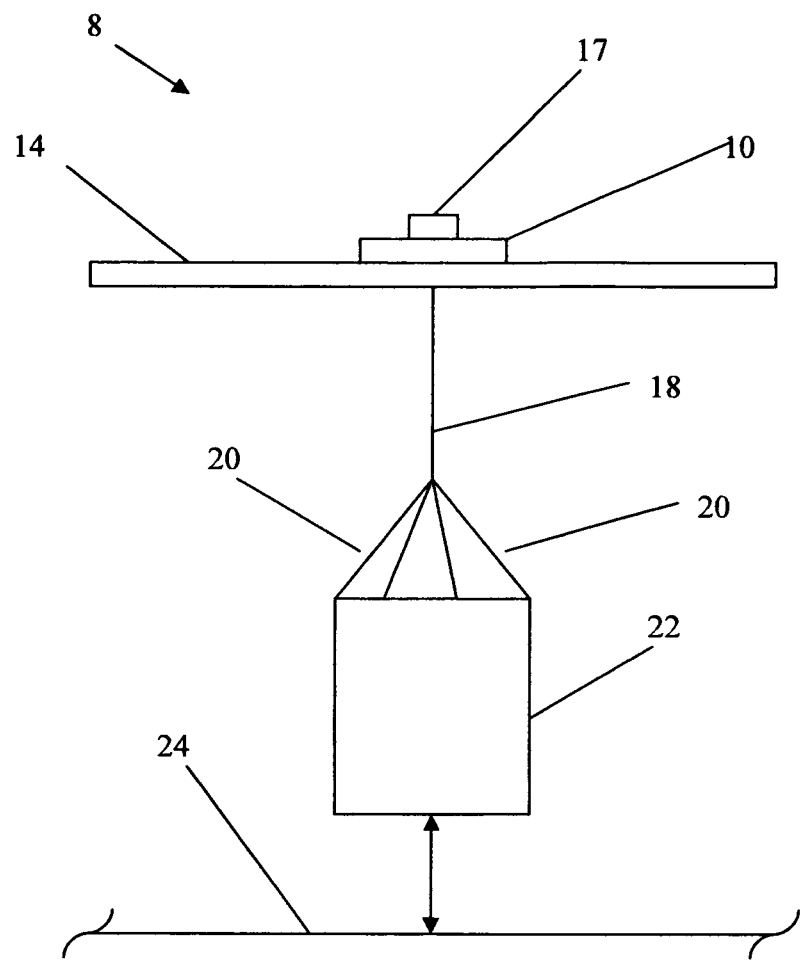
FIG. 2 is a not-to-scale partially-diagrammatical side view of the impermeable lignocellulosic material FIG. 1 together with apparatus components of a strength-testing method.

A plurality of four inch by four inch samples (described below) were tested to determine comparative structural strengths using the test apparatus 8 shown in FIG. 1 and FIG. 2. As shown in FIG. 1 and FIG. 2, a four inch by four inch wood-based lignocellulosic material sample, designated here as the sample 10, having a 1/16 inch center hole (not shown) is placed squarely over a 6.0 inch by 2.5 inch rectangular aperture 12 in an elevated rigid platform 14. A 2.0 inch diameter washer 16 which is center-anchored via a nut (not shown) and bolt 17 to a thin wire 18 is placed squarely over the sample 10 and the wire 18 is run through the center hole and down through the aperture 12 to where it is secured to each of four wire sections 20 from which a five gallon container 22 is held suspended about six inches above the ground 24. Sand (not shown) is then slowly added to the container 22 until the sample 10 fails to the extent that the sample 10, together with the washer 16, is pulled through the aperture 12 and the container 22 falls to the ground 24.

The weight causing such failure of the sample 10 ("load at failure point") is recorded as the combined weight of the sand added to the container 22, the container 22, the washer 16, the nut, the bolt 17, the wire 18 and the wire section 20.

This test was repeated for a plurality of modified samples of the present invention and comparable unmodified samples (controls). All of these samples could withstand the applied weight prior to the addition of sand to the container.

Strength-Test Samples

Examples 1-4 are each a multi-sample series of tests using samples that were prepared from a different source of porous wood-based lignocellulosic material. Two different corrugated cardboard sources, each from different corrugated cardboard boxes, were used in Examples 1 and 2, and these are referred to as "corrugated cardboard #1" (or "cc1") and "corrugated cardboard #2" (or "cc2"). Two different cardboard sources, each from the backing of different pads of paper, were used in Examples 3 and 4, and these are referred to as "solid cardboard #1" (or "sc1") and "solid cardboard #2" (or "sc2").

In all instances the fluid immobilized silica precursor used was Nyacol® 830 (Nyacol® is a registered trademark of, and Nyacol® 830 is available from, Nyacol Products, Inc. of Ashland, Mass.), which is a colloidal silica (28.3-31.6% SiO2) having a pH of 9.8-11.2 and a viscosity of 6-13 cps. This silica sol was charged to the pore matrix of each sample by total immersion of the sample in the fluid for thirty minutes and cured by drying at 220 degrees F. to a constant temperature. The charging encompassed one or more of such immersions, and each immersion was followed by such an elevated-temperature-dried curing. In each series, samples were prepared using additional immersions (each followed by curing) until little additional bonded silica filling is added by the last immersion; for the corrugated cardboard samples, this point was reached after four immersions, and for the solid cardboard samples, this point was reached after three immersions.

Each of the series of tests of Examples 1-4 included a control, which in each instance was a four inch by four inch sample from the same source that was immersed in water, rather than a fluid immobilized silica precursor, for thirty minutes and then dried at 220 degrees F. to a constant weight.

Results

The identification and description of the samples as to cardboard type and source, number of immersions, initial weight, final weight (weight after final immersion and curing), weight of silica fill (difference between initial and final weights) and the load at failure point (loaded weight causing failure of the sample) are set forth in Table 1 below. The controls are indicated by "C-_____" sample numbers.

TABLE 1

Strength Tests of Examples 1-4

| Sample No. | Sample Source | Number of Immersions | Initial Wt. (g.) | Final Wt. (g.) | Fill Wt. (g.) | Load at Failure (g.) |
|---|---|---|---|---|---|---|
| Example 1 | | | | | | |
| C-1 | cc1 | (1 in water) | 5.53 | 5.50 | n/a | 5,225.6 |
| 1-1 | cc1 | 1 | 5.52 | 8.83 | 3.31 | 12,417.2 |
| 1-2 | cc1 | 2 | 5.57 | 10.60 | 5.03 | 13,736.7 |
| 1-3 | cc1 | 3 | 5.59 | 12.21 | 6.62 | 15,220.2 |
| 1-4 | cc1 | 4 | 5.57 | 13.93 | 8.36 | 17,344.8 |

TABLE 1-continued

Strength Tests of Examples 1-4

| Sample No. | Sample Source | Number of Immersions | Initial Wt. (g.) | Final Wt. (g.) | Fill Wt. (g.) | Load at Failure (g.) |
|---|---|---|---|---|---|---|
| Example 2 | | | | | | |
| C-2 | cc2 | (1 in water) | 5.55 | 5.49 | n/a | 5,028.1 |
| 2-1 | cc2 | 1 | 5.49 | 8.31 | 2.82 | 11,109.5 |
| 2-2 | cc2 | 2 | 5.48 | 11.81 | 6.33 | 11,856.0 |
| 2-3 | cc2 | 3 | 5.54 | 13.05 | 7.51 | 12,825.6 |
| 2-4 | cc2 | 4 | 5.57 | 13.93 | 8.36 | 14,692.8 |
| Example 3 | | | | | | |
| C-3 | sc1 | (1 in water) | 5.05 | 5.01 | n/a | 2,045.9 |
| 3-1 | sc1 | 1 | 5.11 | 7.89 | 2.78 | 3,168.0 |
| 3-2 | sc1 | 2 | 5.06 | 8.38 | 3.32 | 4,220.9 |
| 3-3 | sc1 | 3 | 4.96 | 8.78 | 3.82 | 5,659.6 |
| Example 4 | | | | | | |
| C-4 | sc2 | (1 in water) | 4.99 | 4.89 | n/a | 2,102.0 |
| 4-1 | sc2 | 1 | 5.05 | 7.75 | 2.70 | 3,464.9 |
| 4-2 | sc2 | 2 | 5.02 | 8.11 | 3.09 | 4,399.1 |
| 4-3 | sc2 | 3 | 4.88 | 8.73 | 3.85 | 5,366.2 |

EXAMPLES 5-7

Fire-Resistance Test Procedure and Apparatus

A plurality of four inch by four inch samples were tested to determine comparative fire resistance by separately placing a sample perpendicular to the ground up against a brick, and then firing a propane torch directly at the center of the sample at a distance of five inches for a time period of thirty minutes. The sample surface temperature during this procedure, as measured by an infrared temperature monitor, was 482 degrees C.

This test was conducted on a plurality of modified samples of the present invention and comparable unmodified samples (controls). None of the controls could withstand the thirty minutes of applied firing and instead were totally consumed in under two minutes.

Fire-Resistance Test Samples

Examples 5-7 are each single-sample tests using samples that were prepared from the same source of porous wood-based lignocellulosic material, namely one of the cardboard sources described above and referred to as "solid cardboard #1" (or "sc1").

In all instances the fluid immobilized silica precursor used was Nyacol® 830 (Nyacol® is a registered trademark of, and Nyacol® 830 is available from, Nyacol Products, Inc. of Ashland, Mass.), which is a colloidal silica (28.3-31.6% SiO2) having a pH of 9.8-11.2 and a viscosity of 6-13 cps. This silica sol was charged to the pore matrix of each sample by total immersion of the sample in the fluid for thirty minutes and cured by drying at 220 degrees F. to a constant temperature. The charging encompassed one or more of such immersions, and each immersion was followed by such an elevated-temperature-dried curing.

Each of the tests of Examples 5-7 included a control, which in each instance was a four inch by four inch sample from the same source that was immersed in water, rather than a fluid immobilized silica precursor, for thirty minutes and then dried at 220 degrees F. to a constant weight.

Results

The identification and description of the samples as to cardboard type and source, number of immersions, initial weight, final weight (weight after final immersion and curing), weight of silica fill (difference between initial and final weights) and the surviving weight (sample weight after thirty minutes of propane-torch firing), and for the controls the number of seconds to total consumption ("_____ sec.") are set forth in Table 2 below. The controls are indicated by "C-_____" sample numbers.

TABLE 2

Fire-Resistance of Examples 5-7

| Sample No. | Sample Source | Number of Immersions | Initial Wt. (g.) | Final Wt. (g.) | Fill Wt. (g.) | Surviving Wt. (g.) |
|---|---|---|---|---|---|---|
| Example 5 | | | | | | |
| C-5 | cc1 | (1 in water) | 4.55 | 4.49 | n/a | (100 sec.) |
| 5-1 | cc1 | 1 | 4.54 | 6.76 | 2.22 | 4.59 |
| Example 6 | | | | | | |
| C-6 | cc1 | (1 in water) | 4.52 | 4.47 | n/a | (93 sec.) |
| 6-1 | cc1 | 2 | 4.61 | 7.86 | 3.25 | 5.24 |
| Example 7 | | | | | | |
| C-7 | cc1 | (1 in water) | 4.59 | 4.54 | n/a | (61 sec.) |
| 7-1 | cc1 | 3 | 4.58 | 8.29 | 3.71 | 5.65 |

After thirty minutes of propane torch firing, the surfaces of the modified samples were slightly charred and had a whitish appearance in the center which had been in direct contact with the flame of the torch.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

We claim:

1. A method for modifying porous wood-based lignocellulosic material having a pore matrix filled with a pore-matrix fluid comprising:
   incorporating a bonded silica filling into said pore matrix of said lignocellulosic material by the steps of
   displacing pore-matrix fluid by charging a fluid immobilized-silica precursor to said pore matrix, said fluid immobilized-silica precursor consisting essentially of a fluid carrier and an immobilized silica precursor selected from the group consisting of a water-glass solution of silica subunits and a colloidal silica within a particle-size range of from 10 to 80 Angstrom units; and
   then curing said immobilized-silica precursor to provide a silica filling bonded to said pore matrix.

2. A method for modifying porous wood-based lignocellulosic material having a pore matrix according to claim 1 wherein said fluid carrier is water.

3. A method for modifying porous wood-based lignocellulosic material having a pore matrix according to claim 1 wherein said immobilized-silica precursor is a combination of a plurality of monodispersed colloidal silicas each within a particle-size range of from 10 to 80 Angstrom units.

4. A method for modifying porous wood-based lignocellulosic material having a pore matrix according to claim 1 wherein said colloidal silica is charged to said pore matrix by ambient-pressure immersion of said lignocellulosic material in said colloidal silica.

5. A method for modifying porous wood-based lignocellulosic material having a pore matrix according to claim 1 wherein said colloidal silica is charged to said pore matrix by pressurized immersion of said lignocellulosic material in said colloidal silica.

6. A method for modifying porous wood-based lignocellulosic material having a pore matrix according to claim 1 wherein said charging is a combination of an ambient-pressure immersion and a pressurized immersion.

7. A method for modifying porous wood-based lignocellulosic material having a pore matrix according to claim 1 wherein said charging is a plurality of cycles of immersion followed by curing.

8. A method for modifying porous wood-based lignocellulosic material having a pore matrix according to claim 1 wherein said curing is an air drying to constant weight.

9. A method for modifying porous wood-based lignocellulosic material having a pore matrix according to claim 1 wherein said curing is an elevated-temperature drying to constant weight.

10. A method for modifying porous wood-based lignocellulosic material having a pore matrix according to claim 1 wherein said porous wood-based lignocellulosic material is corrugated cardboard.

\* \* \* \* \*